(12) United States Patent
Sato et al.

(10) Patent No.: US 6,400,689 B1
(45) Date of Patent: *Jun. 4, 2002

(54) NETWORK SERVICE MANAGEMENT APPARATUS

(75) Inventors: Miyuki Sato; Yoshiko Doi; Kyoko Oya; Noritaka Fujinaka, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,604

(22) Filed: Aug. 10, 1998

(30) Foreign Application Priority Data

Mar. 20, 1998 (JP) .......................... 10-072764

(51) Int. Cl.[7] .................. G01R 31/08; G06F 11/00; G08C 15/00; H04J 1/16; H04J 3/14
(52) U.S. Cl. .................. 370/242; 370/244; 709/223
(58) Field of Search ................ 370/389, 390, 370/391, 392, 395, 396, 398, 400, 410, 230, 231, 235, 242, 244, 245; 709/238, 223, 244; 714/799

(56) References Cited

U.S. PATENT DOCUMENTS 5,583,865 A * 12/1996 Esaki et al. ................. 370/397
6,144,661 A * 11/2000 Katsube et al. ............. 370/390

FOREIGN PATENT DOCUMENTS

JP  7-202908  8/1995
JP  8-8917   1/1996

* cited by examiner

Primary Examiner—David R. Vincent
Assistant Examiner—Bob A. Phunkulh
(74) Attorney, Agent, or Firm—Katten Muchin Zavis Rosenman

(57) ABSTRACT

In order to enable to manage each service by paying attention to the services provided on the network, a network managing part which manages network element including the network, a physical link or a path is provided. Further, a service managing part which manages the services which are provided on the network and a work managing part which manages a work definition of the user which is connected to the network are provided. In response to a request from the user, information from the service managing part and the work managing part is referred, thereby generating visually provided information to the user.

5 Claims, 17 Drawing Sheets

NETWORK SERVICE MANAGEMENT APPARATUS

BACKGROUND OF THE INVENTION

1. Field of the Invention

This invention relates to network service management apparatus, in a network system that is constructed by ATM switching network, SDH/SONET or the like, which is used in the network.

2. Description of Related Art

There arise following demands from a service provider which performs a channel resale service as business and in-company users in the network.

It is desired that services such as a VOD (Video On Demand), a Video Conference which is set on an existing network infrastructure, and the like are visually grasped and managed for them.

That is, it is strongly desired that a service using situation is related with a network resource using situation to be monitored and, for this monitoring, a path setting or the like is controlled.

Further, such a manager on the network also wishes to monitor and manage with respect to a work in the manager's charge, for example, only to perform management which is necessary for work allocation in relation to a management work of each of customers for whom the services are provided, a management work of the whole service using situation or the like.

The network is comprised of a series of "management domains" having a specific responsibility and control range, respectively. Management domains are concerned with an individual service which the network provides for the customer for the manager of the service using situation. The management of the service using situation covers widely from the customer management to the management of the network resource and the various kinds of management works exist. Hitherto, there is not, however, means for combining the service with the network resource, the customer management or the like to be managed. Cooperation among systems in which the network management system is introduced has to be performed manually for the management of the network resource.

That is, the network management system of the conventional technique is designed to manage the apparatus, and is not designed to monitor and control from the viewpoint of using service.

There is an embodiment of the prior art to which a plurality of different services are provided while having the same apparatus in common. It is not, however, designed to manage the network and apparatus which correspond to every service.

Further, the conventional network management system is only a managing system for alternatively selecting whether the same managing function is provided for all of the managers or a function which the manager can use is restricted by security. There is not provided a function by which each of the managers of the system to be provided therein can freely set a function (for example, the maintenance of a specific service or the like) necessary for the work, so that effective management suitable for the actual situation of the management cannot be realized and labor and cost of the management work is increased.

SUMMARY OF THE INVENTION

The present invention has been made in order to solve the above-described problems, and therefore has a technical object to provide a technique that enables the management of each service by paying attention to the services which are provided on the network.

In order to solve the above problems, the following conditions need to be satisfied:

(1) The management of a plurality of services on the same network resource can be performed by closely combining with monitoring and controlling the network resource; and (2) A number of service managers can effectively execute only management suitable for each work.

As for means for satisfying the above conditions, the service management system is realized in a manner such that the apparatus has a work definition database (policy) of the service manager and converts the policy into an instruction for setting a necessary pass or obtaining monitoring information for the network or each NE (Network Element).

More specifically, the present invention includes the following means.

According to a first aspect of the present invention, in communication services which are provided on one or a plurality of networks, network managing means for managing elements, a physical link, or a path, which constructs the network, service managing means for managing the services provided on the network, and work managing means for managing a work definition of a user which is connected to the network are provided. In response to a request from the user, information from the network managing means is related to information from the service managing means and, further, the work managing means is referred, thereby generating services to be provided to the user.

By relating network information with service information, information which occurs on the network, for example, fault information or the like can be related as an influence on the services. For the user, different information can be provided depending upon whether the user is a network manager, service manager, or user. That is, information as to the whole network is provided for the network manager and only path information for which the services are provided for the service manager. For the user, only path information to the user from the server that provides the services can be provided.

According to a second aspect of the present invention, in the first aspect of the invention, there are provided element accessing means for collecting information from the network elements as service management information generating means, domain management means for dividing the network into domains and managing the domains each of which is managed by each subnetwork manager, and multi-domain managing means, provided in every network, for setting and releasing an end-to-end communication path on the network.

Information from the network element is, for example, element information, slot information, port information, an alarm, a channel using state, routing information or the like. Specifically, those fault information is collected and is informed to the upper domain managing means and multi-domain managing means, so that a new path which reflects the fault information can be set and a correspondence relation between the path and physical network can newly be generated and can soon be reflected to the service management.

According to a third aspect of the present invention, in the first or second aspect of the invention, there is provided work view generating means for generating an individual work view for the user with reference to work management information.

As for a work view, the information of each user which is requested as mentioned above is expressed by a GUI (graphical user interface), thereby enabling only the services which can intuitively be grasped to be displayed on a picture plane.

According to a fourth aspect of the present invention, in the first or second aspect of the invention, there is provided discriminating means for evaluating validity of the work definition when a petition of the work definition from the petitioned user.

Thus, it is possible to evaluate the validity of the user.

According to a fifth aspect of the present invention, in the second aspect of the invention, there is provided fault detecting means on the network and fault information converting means for converting fault detection information into information within an influence range.

Therefore, the fault information can be reflected to the service information for the user. For instance, in case where a communicating fault occurs in a specific element and the escape path is set, the path information to be escaped can be provided for the user. The escape path information can be provided as graphic information by employing the third aspect of the invention.

According to a sixth aspect of the present invention, in the second or fifth aspect of the invention, there is provided fault information converting means for the element accessing means.

The fault information converting means is provided for the element accessing means as the lowest module which is the closest to the element, to thereby enable easily grasping an influence range by the fault.

DETAILED DESCRIPTION OF THE PREFERRED EMBODIMENTS

Figure 2:
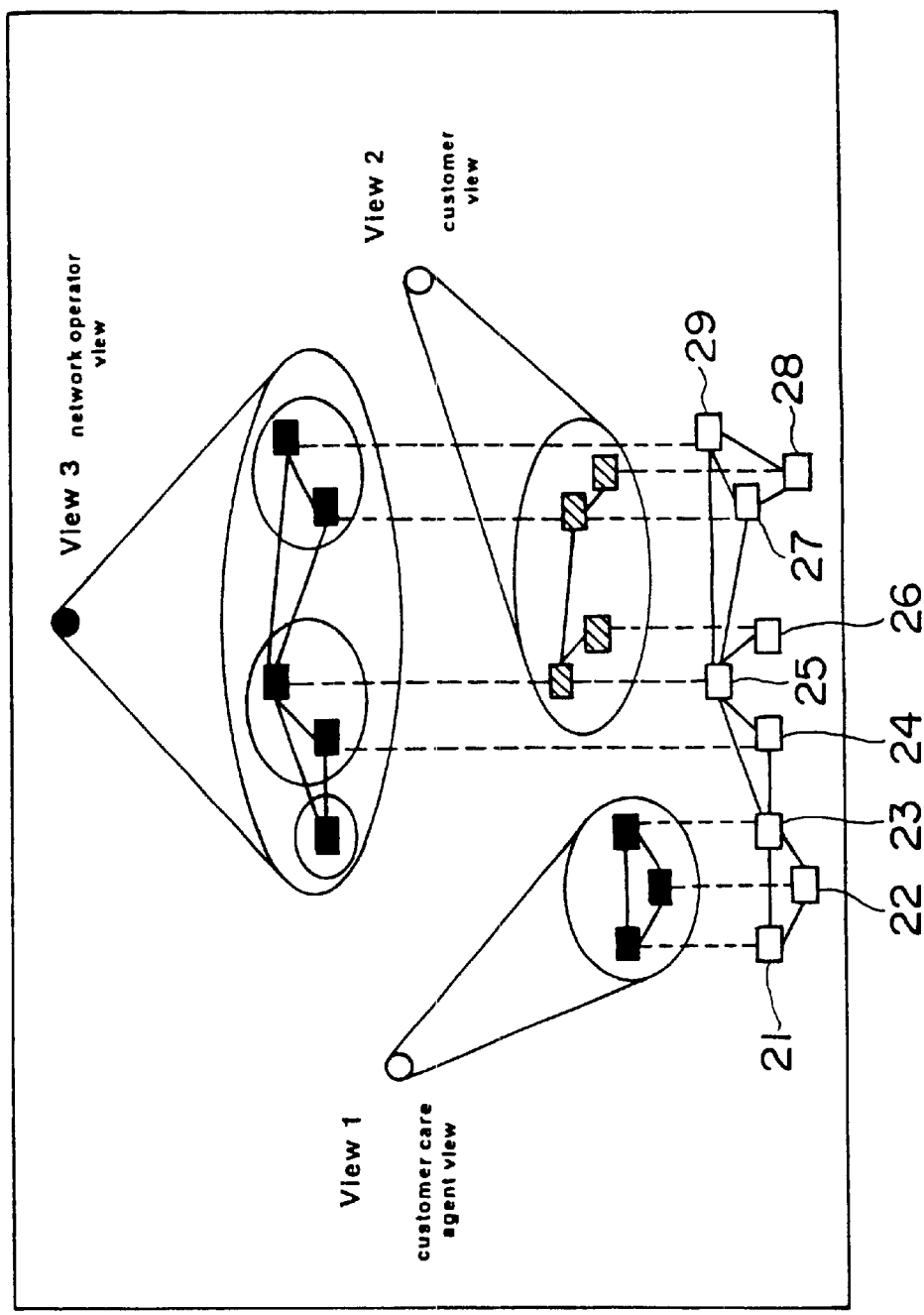
FIG. 2 is an explanatory diagram showing a concept of a work view according to the embodiment of the present invention.

Before description of embodiments of the present invention, a concept of a work view necessary for a service manager according to this embodiments is shown in FIG. 2.

FIG. 2 indicates how a network should be seen in view of services for each manager. Reference numerals 21 to 29 denote network elements (NE) comprised of an ATM switch or the like. The network structure can be displayed as cooperation of the network elements 21 to 23 for a customer care (customer management) agent (view 1), and be displayed as cooperation of the network elements 25 to 28 for a customer operator (View 2), Further, the network structure can be displayed as cooperation of the network elements 22, 23, 24, 27, and 29 for a network operator (View 3).

The Views 1 to 3 are displayed into terminal element of the operator, respectively, thereby enabling the visual apprehension easily.

As mentioned above, a service management system 100 provides each view which can cope with the request of different views by the same system. For example, the customer care agent needs the view (View 2) in which the services are provided and a fault situation of the services is noticed for a customer in charge and a path setting of the network within the determined range can be performed. The customer requests the view (view 2) by which he can see a use fault situation of the services contracted by him/her. Since it is necessary for a network operator to manage the whole network resource for which the services are provided, the view (View 3) is provided to manage a path setting, a connecting situation, a sufficient band, and the like.

Figure 3:
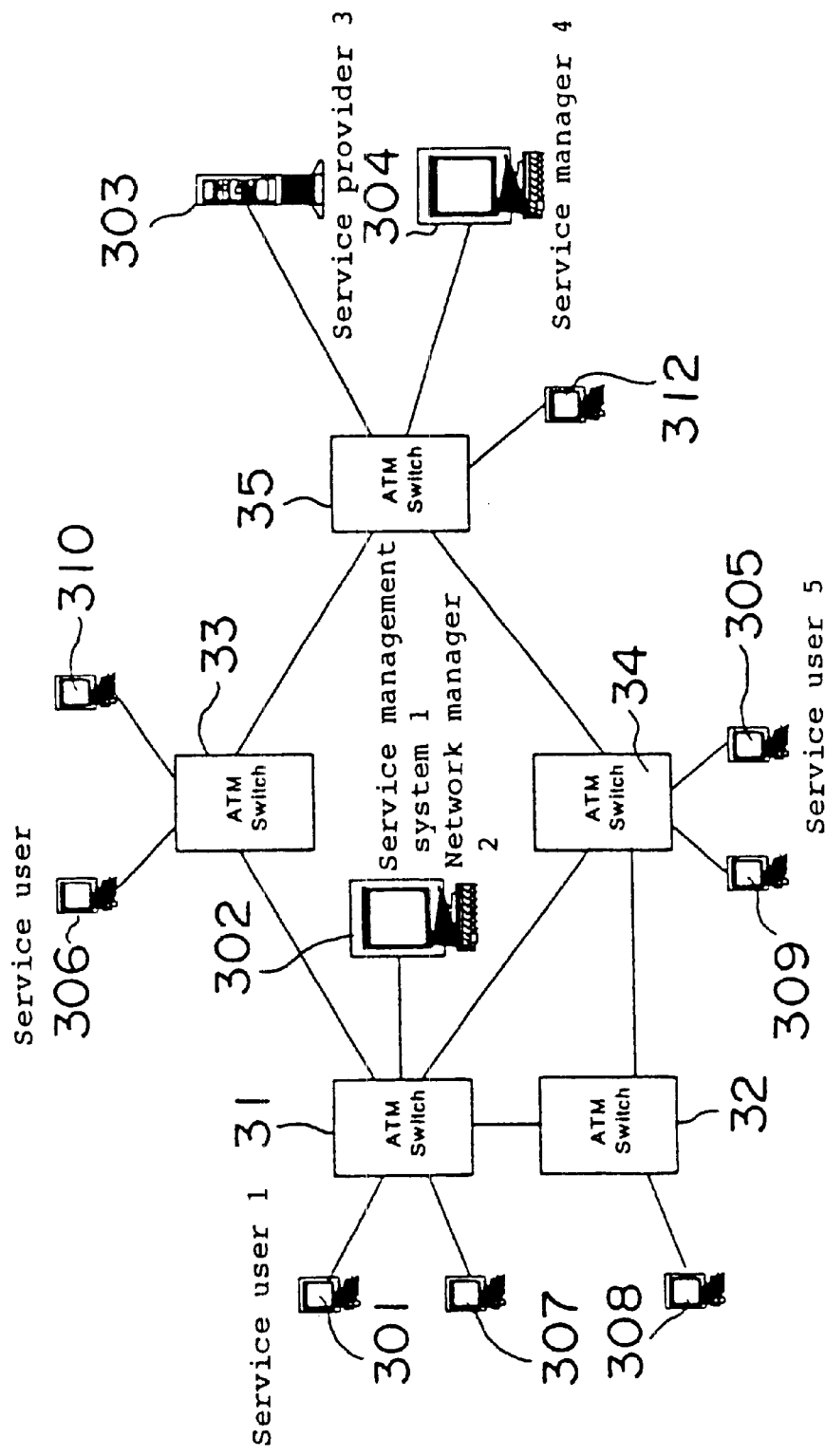
FIG. 3 is an explanatory diagram showing an ATM network according to the embodiment of the present invention.

Such a system will be described by a specific ATM network structure as shown in FIG. 3.

Reference numerals 31 to 35 denote ATM switches. A network managing terminal 302 is connected to the ATM switch 31. A service providing terminal 303 and a service managing terminal 304 are connected to the ATM switch 35. Service using terminals which use the services are shown by reference numerals 301, 305, and 306. It is assumed that terminals 307 to 310 other than those are not concerned with this services (the services provided by the service providing terminal 303).

Figure 4:
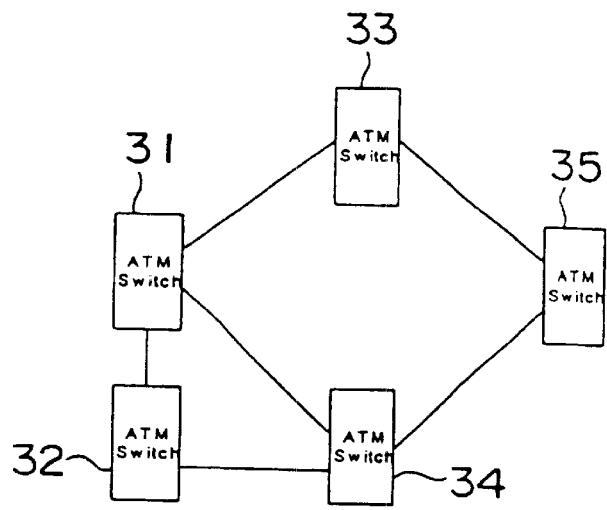
FIG. 4 is an explanatory diagram showing a work view of a network manager according to the embodiment of the invention.

FIG. 4 indicates the view of network managing terminal 302 for the network structure. The network manager is a manager for the ATM network, and therefore the manager has to monitor all ATM switches 31 to 35. Consequently, relative paths among the ATM switches 31 to 35 are displayed in the view of the network managing terminal 302. The fact that the respective paths are illustrated by solid lines in FIG. 4 shows that the network managing terminal 302 has the operating authority for the ATM switches 31 to 35 which are connected by those paths.

Figure 5:
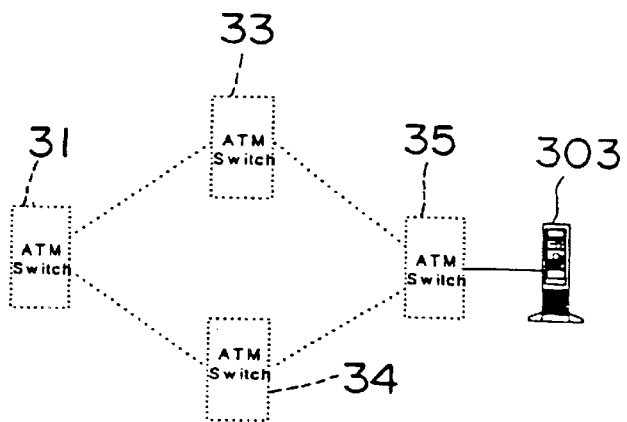
FIG. 5 is an explanatory diagram showing a work view of a service manager according to the embodiment of the present invention.

FIG. 5 shows a view of the service managing terminal 304. For the service manager, only paths among the ATM switches 31 to 35 which are connected to the service using terminals 301, 305, and 306 are displayed. Paths shown by dotted lines indicate paths which have no operating authority and are permitted to monitor only.

Figure 6:
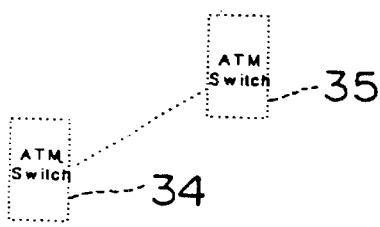
FIG. 6 is an explanatory diagram showing a work view of a service user according to the embodiment of the present invention.

FIG. 6 shows a view of the service using terminal 305. Since, for a user of the service using terminal 305, it is sufficient that path from his/her own terminal to the service providing terminal 303 is displayed, only ATM switches 34 and 35 consisting the path are shown by the dotted lines (only monitoring is permitted).

As mentioned above, in this embodiment, for the service manager or the user of the services existing on the network, a mechanism to display a work view which is necessary and sufficient to give the proper authority for his/her situation will be described hereinafter.

Figure 1:
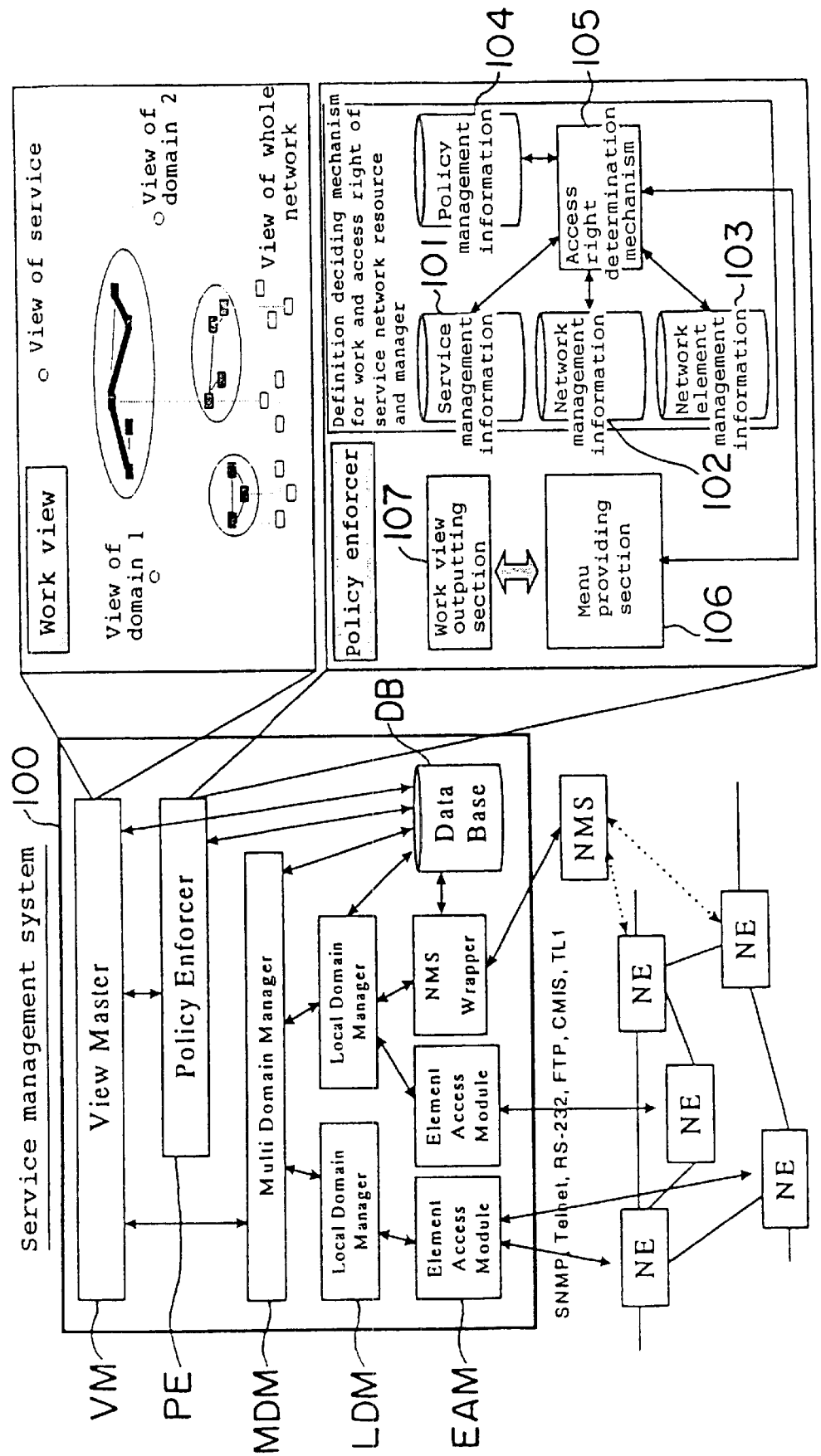
FIG. 1 is an explanatory diagram of a service management system according to an embodiment of the present invention.

FIG. 1 is a conceptual diagram of a service management system 100 in this embodiment of the present invention.

In FIG. 1, an NE (Network Element) denotes a relay element such as the ATM switch described in FIGS. 3 to 6. An EAM, an LDM, an MDM, a DB, a PE, and VM indicate an element access module (Element Access Module), a local domain manager (Local Domain Manager), a multi-domain manager (Multi-Domain Manager), a database, a policy enforcer (Policy Enforcer), and a view master (View Master), respectively.

Each function can specifically be realized by an object by software components.

The individual components will be described hereinbelow.

(Element Access Module: EMA)

The element access module (EAM) has a function to manage information corresponding to each element (NE) on the network, for example, element information, slot information, port information, an alarm, a channel using situation, routing information, and the like. The element access module (EAM) is customized for every classification of element. One instance can manage a plurality of the same kind elements in the domain. In the case where information collection management system (NMS Wrapper) from an existing network management system (NMS: Network Management System) exists, only necessary information is collected from the existing network management system (NMS) instead of directly collecting information from the element. In this case, a detailed information picture plane is displayed by transferring a picture plane of the existing network management system (NMS) to a CRT of the network management system 100 or the like.

The existing information collection management system (NMS Wrapper) is cooperated with the network management system (NMS) which has already been set to the existing network or a carrier network and has a function to collect necessary and minimum information.

(Local Domain Manager: LDM)

A local domain manager (LDM) divides the network into a "domain" unit which is managed by each subnetwork manager and has a function to manage the domains. The domains can be divided in association with a management unit such as an area unit, a section unit, a kind of network unit or the like. The local domain manager (LDM) cooperates with each element access module (EAM) in the domains and performs an alarm management in the domains and a path setting.

(Multi-domain Manager: MDM)

With respect to a multi-domain manager (MDM), one instance exists for one network and the whole network is managed. The multi-domain manager (MDM) cooperates with each local domain manager (LDM) and performs an alarm management of the network and an end-to-end (End-to-end) path setting. When a request for the end-to-end path setting is received from the network element (NE), the multi-domain manager (MDM) determines a routing and requests the path setting for each local domain manager (LDM) through which the multi-domain manager (MDM) passes.

(Database: DB)

The database (DB) in this embodiment manages following items.

(1) Node information manages a position/an attribute/a state of the node, and the like.

(2) Link information manages an interface and a channel using situation between the nodes.

(3) Routing information manages a routing at the time of the end-to-end path setting.

(4) Connection information manages an attribute information of the set path step by step (at levels of the EAM, LDM, and MDM, respectively).

(5) Service information manages a service state, and a relation between the connection and the services.

(6) User information manages the services provided by the service provider and the service information used by the service user.

(7) Policy information manages the authority (policy) of the service management which the user has.

(Policy Enforcer: PE)

The policy enforce confirms service or network condition in which the service manager or service user accesses to the service management system and services are provided for a company or an individual, and manages a operable range (policy). Actually, as shown in the lower right diagram in FIG. 1, the access right is determined by the service management information 101, network management information 102, network element management information 103, policy management information 104 or the like (105), an operation menu which adapts to the access right is provided (106), and outputted to the work view of the view master (VM) (107). The service management information 101, network management information 102, policy management information 104 and the like are set to, specifically, the database (DB) which is accessed by the module.

(View Master: VM)

A view master (VM) cooperates with the policy enforcer (PE) and provides a service managing function suitable for the user's policy. A specific interface to the user is supplied by a Web base. That is, the user can obtain visual information as shown in the upper right diagram in FIG. 1 by using an internet viewer which is installed normally in the terminal.

Figure 7:
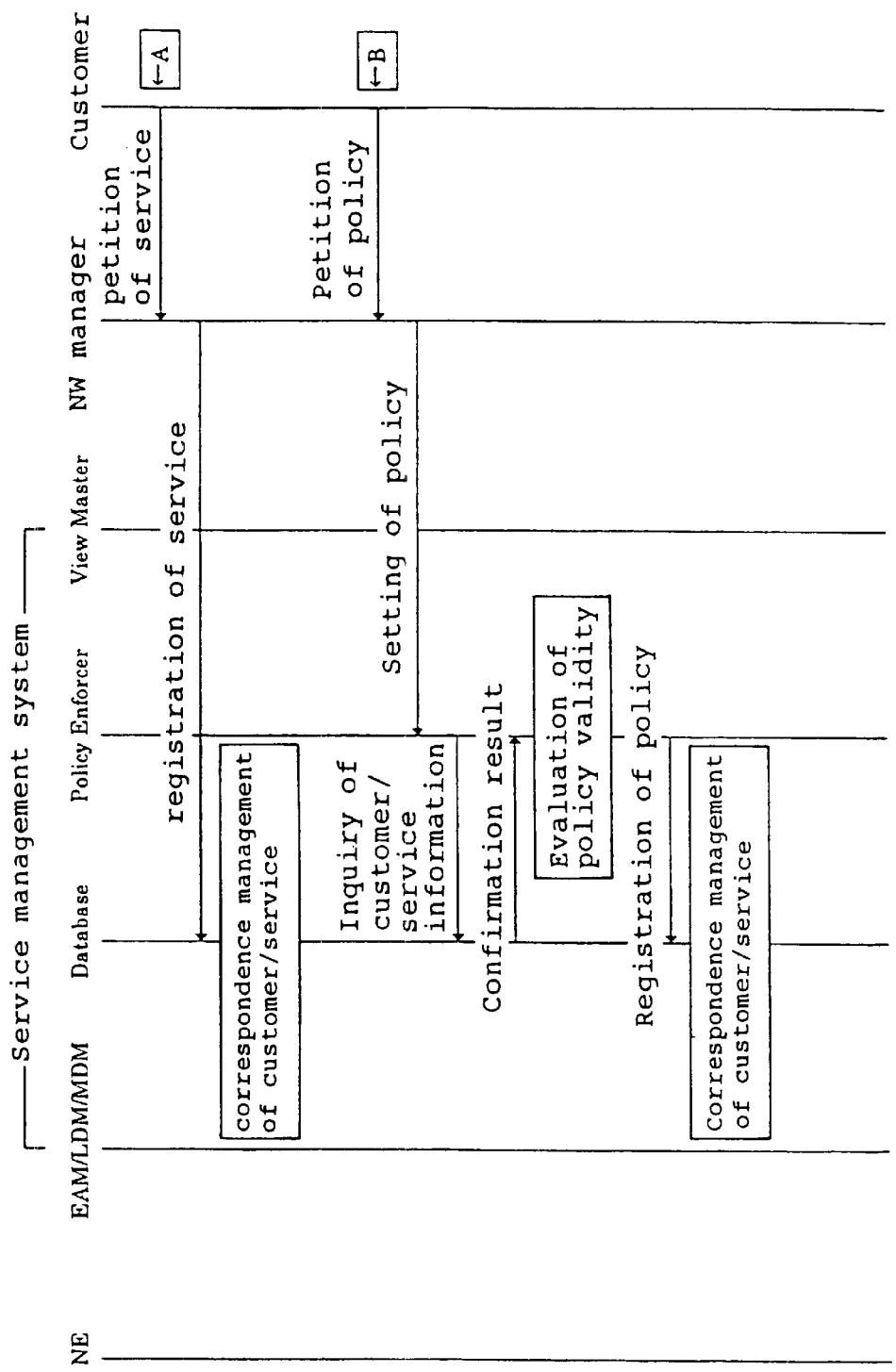
FIG. 7 is a diagram (1) showing a processing procedure of the service management system according to the embodiment of the present invention.

As for each object as mentioned above, a procedure for executing a work view will be described with reference to FIGS. 7 to 9.

First, the user A registers the services for/to which the user provides or receives through the network manager (network managing terminal 302) to the database (DB).

Subsequently, when a policy (work definition) is petitioned by the user B, that is, the network manager of each department in a LAN or a manager of each service provider which provides the services such as VOD, Video Conference or the like via a public network, the network manager (network managing terminal 302) requests the policy enforcer (PE) to set the policy (work definition). At the time of receiving the request, the policy enforcer (PE) inquires the user and the service information for the database (DB). The inquiry is intended to confirm the petitioned user and that the services rightness. If the confirmed result indicates OK, the policy enforcer (PE) registers the policy to the database (DB).

Figure 8:
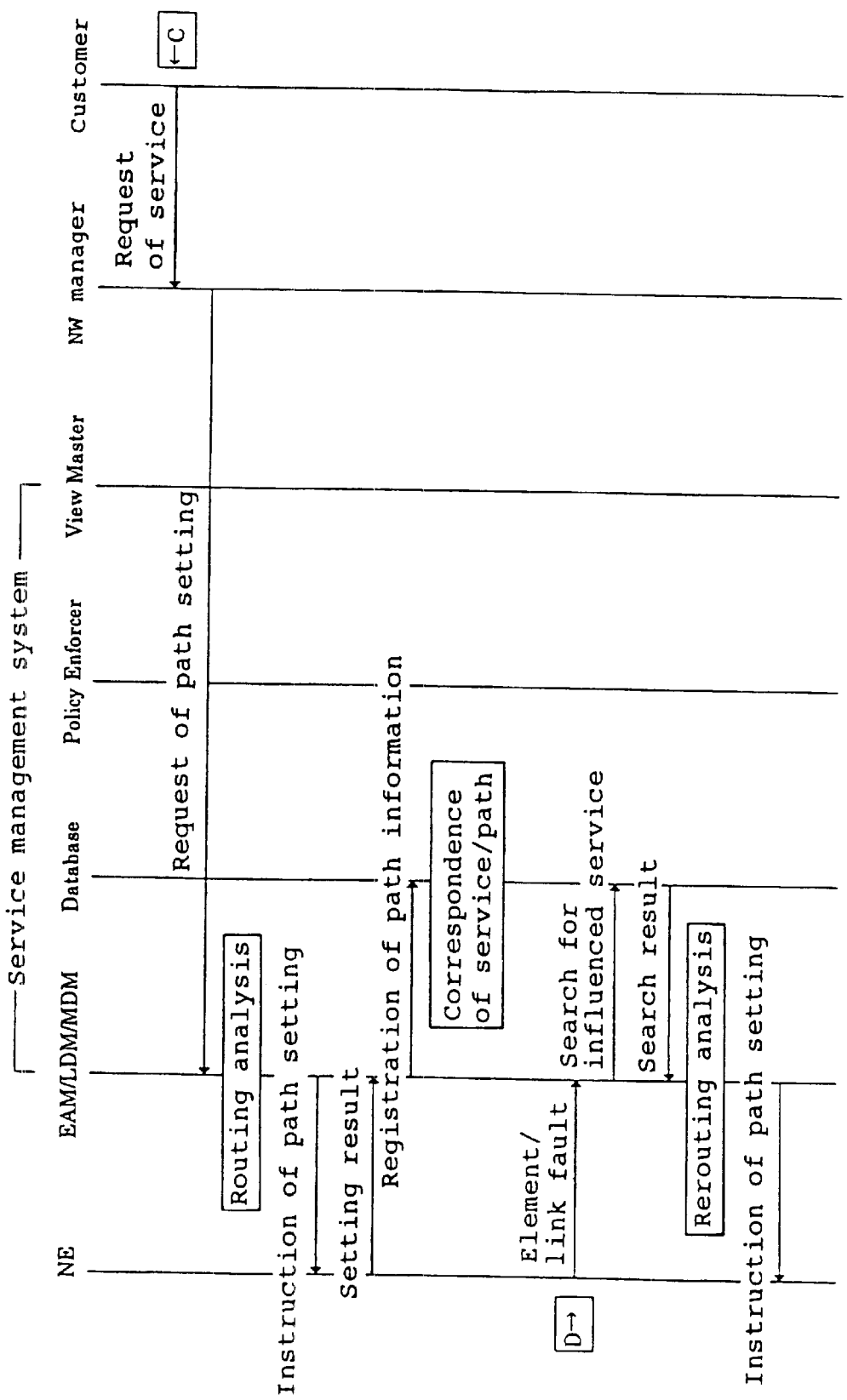
FIG. 8 is a diagram (2) showing a processing procedure of the service management system according to the embodiment of the present invention.

In FIG. 8, when the network manager (network managing terminal 302) receives a request for the services from the user C at the start time of providing the services, a path setting is requested for the service management system 100. On the basis of the request, each of modules of the element access module (EAM), the local domain manager (LDM), and the multi-domain manager (MDM) analyzes the routing and instructs the path setting for network element (NE) group.

When a set result is returned from the network element (NE) group on the basis of this instruction, the path information is registered in the database (DB). By the path setting, the correspondence relation between the service and the path in the database (DB)can be grasped.

In this situation, for example, if a fault of the element or a link fault occurs in a specific element D in the network element (NE) group, each of the modules (EAM, LDM, and MDM) accesses to the database (DB) and searches the services which are influenced by the fault. When the searched result is received by the database (DB), each of the modules (EAM, LDM, and MDM) analyzes the routing and a new path setting is instructed for the network element (NE) group. The function of each module at the time of fault will be mentioned with reference to FIG. 10 described hereinbelow.

In FIG. 8, if a new path is set in the network element (NE) group, the set result is transferred to each of the modules (EAM, LDM, and MDM) and registered into the database (DB) as new path information. Thus, a correspondence relation between the service and the new changed path is registered into the database.

When the user E requests a virtual view, the service management system 100 accesses to the database (DB) from the view master (VM) and searches the policy defined by the user and the service state. On the basis of those searched results, the view master (VM) forms the virtual view and provides a view picture plane as shown in FIG. 1 or 2 for the terminal of the user E (for example, the service using terminal 305 in FIG. 3). In the case where the user E is a service manager, the view is obtained as shown in FIG. 5. Further, when the user E is a network manager, the view is obtained as shown in FIG. 4.

As mentioned in FIG. 8, if the fault occurs in the specific network element D, a new path to avoid the fault is related to the service in the database, so that the virtual view which is provided for the user E is also a virtual view after the fault is avoided.

Figure 10:
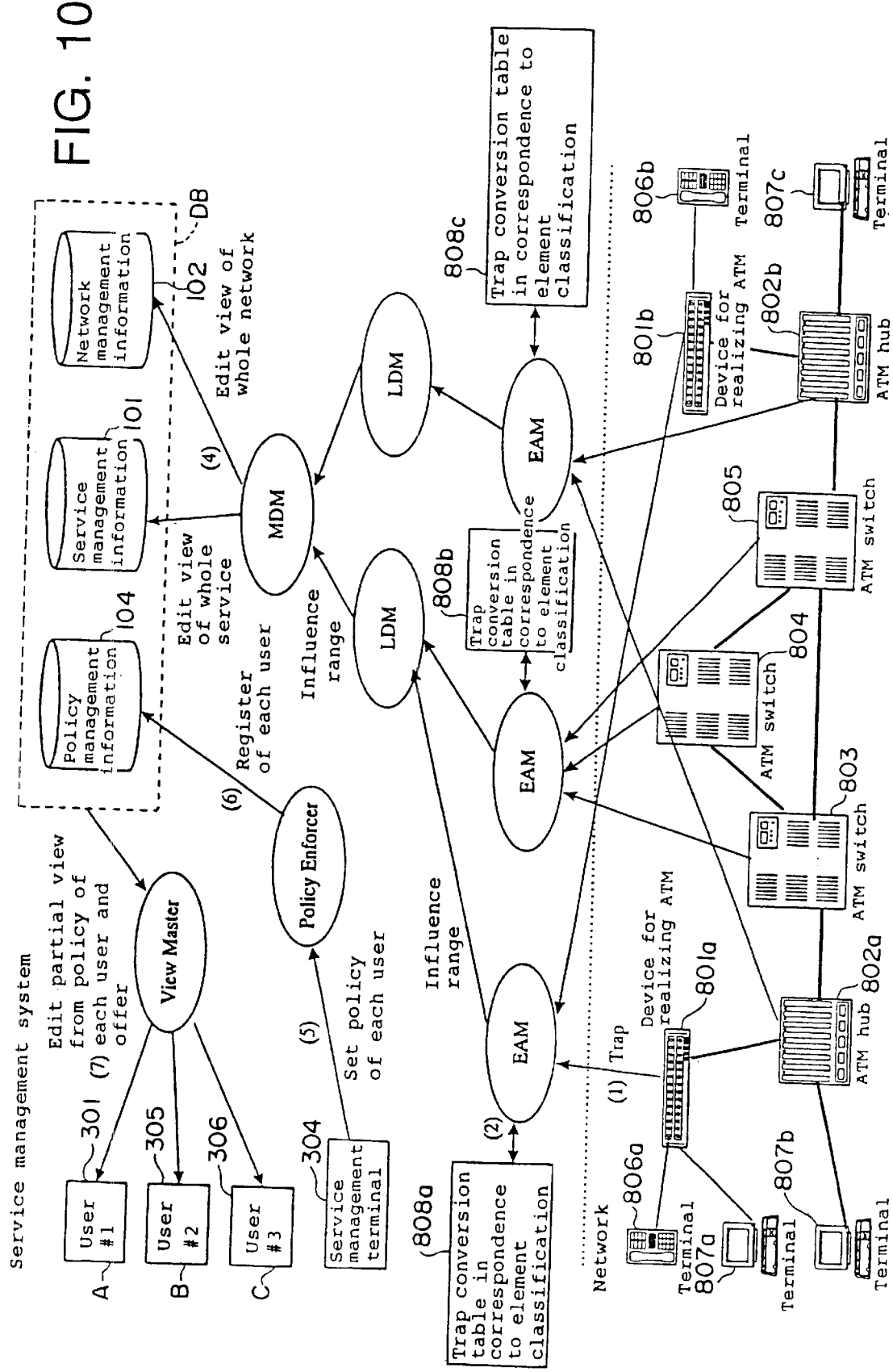
FIG. 10 is an explanatory diagram of the service management system according to the embodiment of the present invention.

With reference to FIG. 10, a method of resetting the path and the services at the time of fault will be described. FIG. 10 is obtained by further specifying FIG. 1 and comprises the network in which ATM switches 803, 804, and 805 take a leading part. The ATM switches 803 and 805 are connected to terminal elements 806 and 807 via ATM hubs 802a and 802b and elements 801a, 801b for realizing ATM. As for terminal elements, telephones 806a and 806b, data terminals 807a, 807b, and 807c, and the like are shown as an example. In FIG. 10, the elements 801a and 801b for realizing ATM, the ATM hubs 802a and 802b, and the ATM switches 803, 804, and 805 are related to the network element (NE) group in FIG. 1.

The element access module (EAM) has trap conversion tables (808a, 808b, and 808c) corresponding to a kind of element. The trap conversion tables (808a, 808b, and 808c) receive trap information from the elements 801a for realizing ATM, ATM the switch 803, ATM hub 802a, and the like and have a function to convert the trap information into influence range information. The influence range information indicates information such as a node fault, a link fault, a degree of fault and the like. Namely, the influence range information converted from the trap information is informed to the multi-domain manager (MDM) via the local domain manager (LDM).

Figure 9:
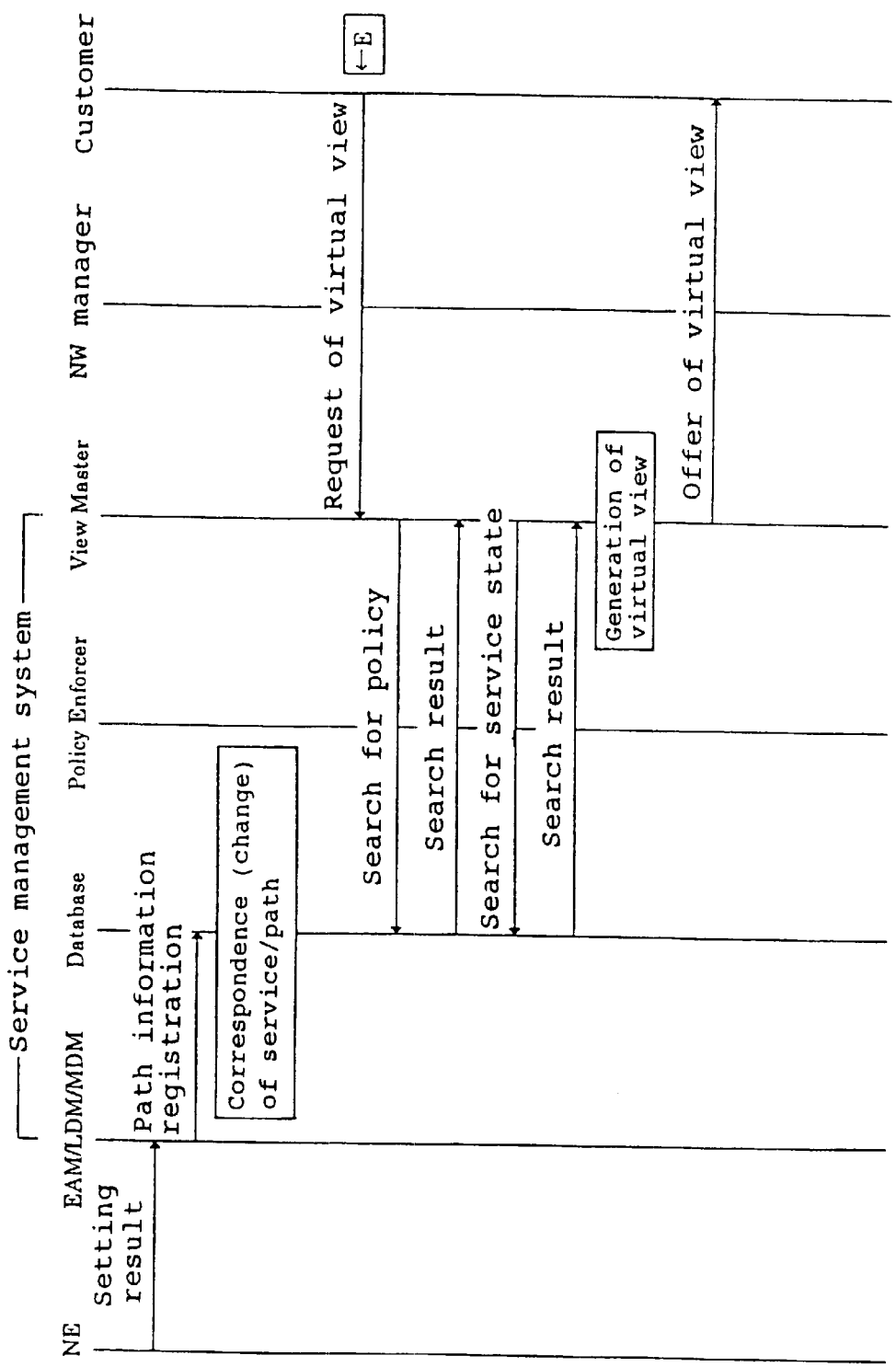
FIG. 9 is a diagram (3) showing a processing procedure of the service management system according to the embodiment of the present invention.

The multi-domain manager (MDM) which receives the influence range information is constructed in a manner such that it is reflected to the service management information 101 and network management information 102 in the database (DB) (refer to FIGS. 8 and 9).

Figure 11:
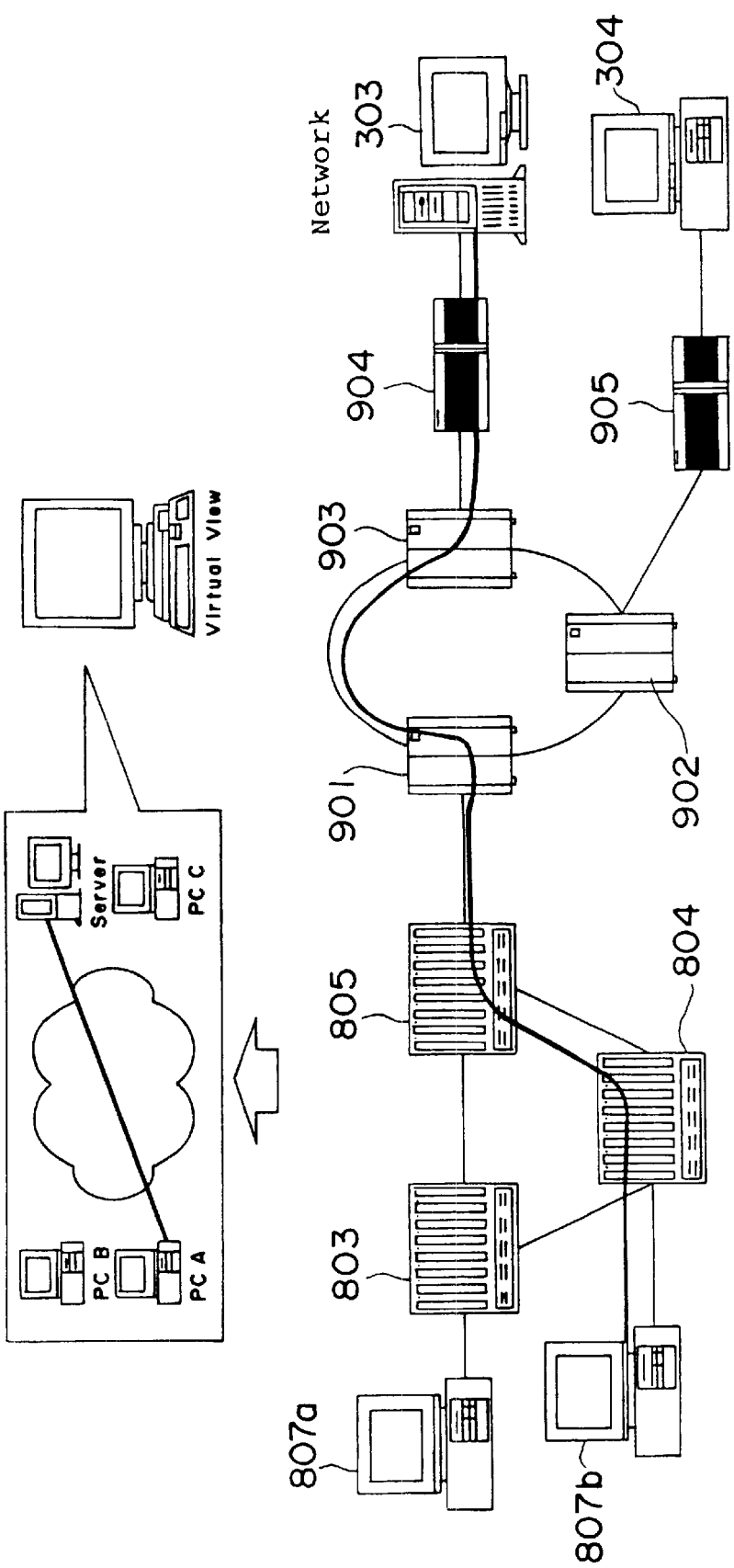
FIG. 11 is a diagram (1) for explaining a work view to monitor the service using situation according to the embodiment of the present invention.
Figure 12:
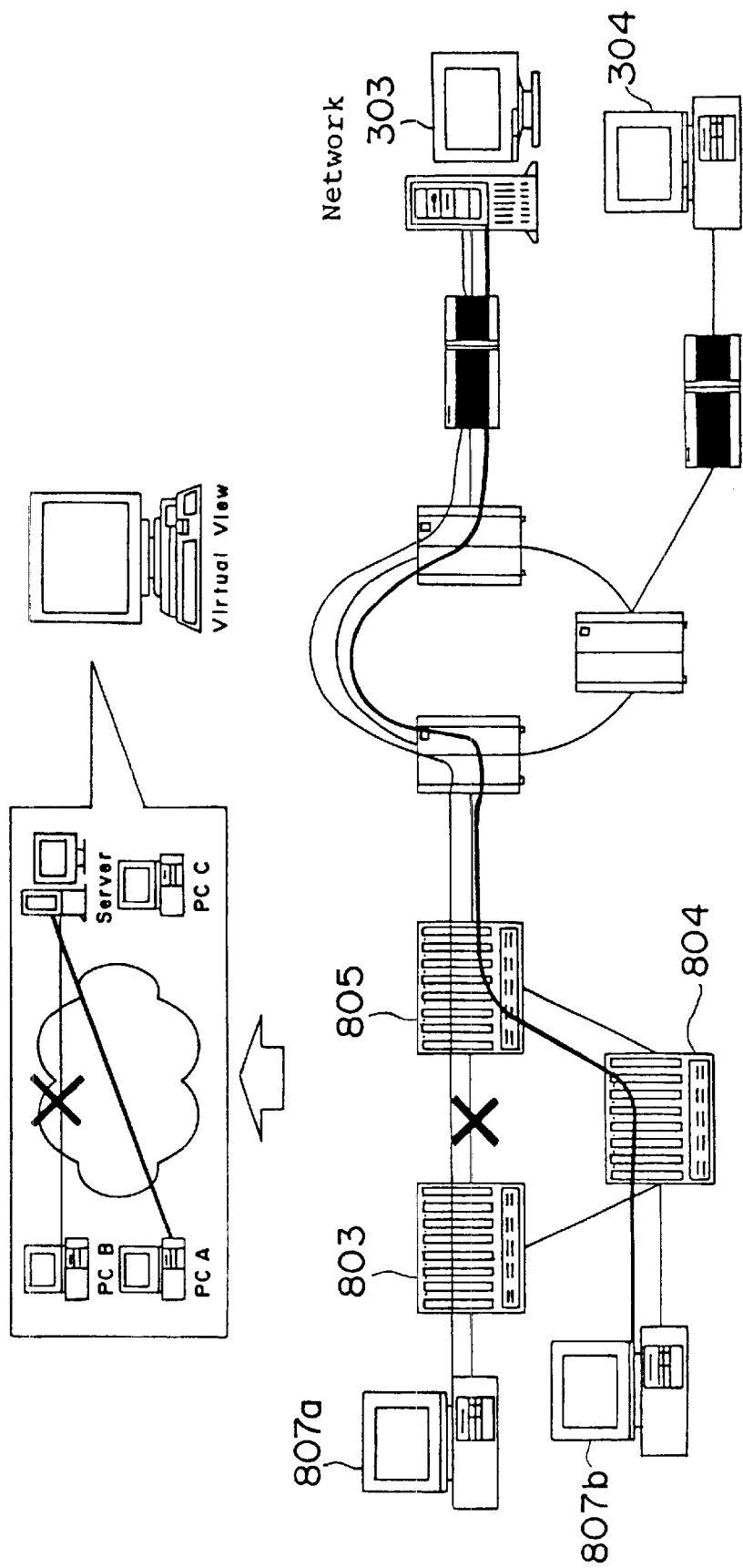
FIG. 12 is a diagram (2) for explaining a work view to monitor the service using situation according to the embodiment of the present invention.

A change in view on the basis of the influence range information will be mentioned with reference to FIGS. 11 and 12.

First, a network structure is assumed as shown in FIG. 11. In FIG. 11, reference numerals 803 to 805 denote ATM switches as network elements (NE); 901 to 903; transmission elements; 904 and 905; access elements to a LAN; 303 service providing terminal; and 304 service management terminal.

As shown in FIG. 12, if a fault of communication lines occurs between the ATM switches 803 and 805, the trap information based on the fault is transmitted to the element module (EAM) and is notified to the database (DB) as influence range information through the local domain manager (LDM) and the multi-domain manager (MDM) in the trap conversion table 808b. In the database (DB), the service management information 101 and the network management information 102 are rewritten on the basis of the influence range information. Therefore, the view in the terminal of the manager is also changed from the view shown at the upper half diagram in FIG. 11 to the view shown at the upper half diagram in FIG. 12.

Figure 13:
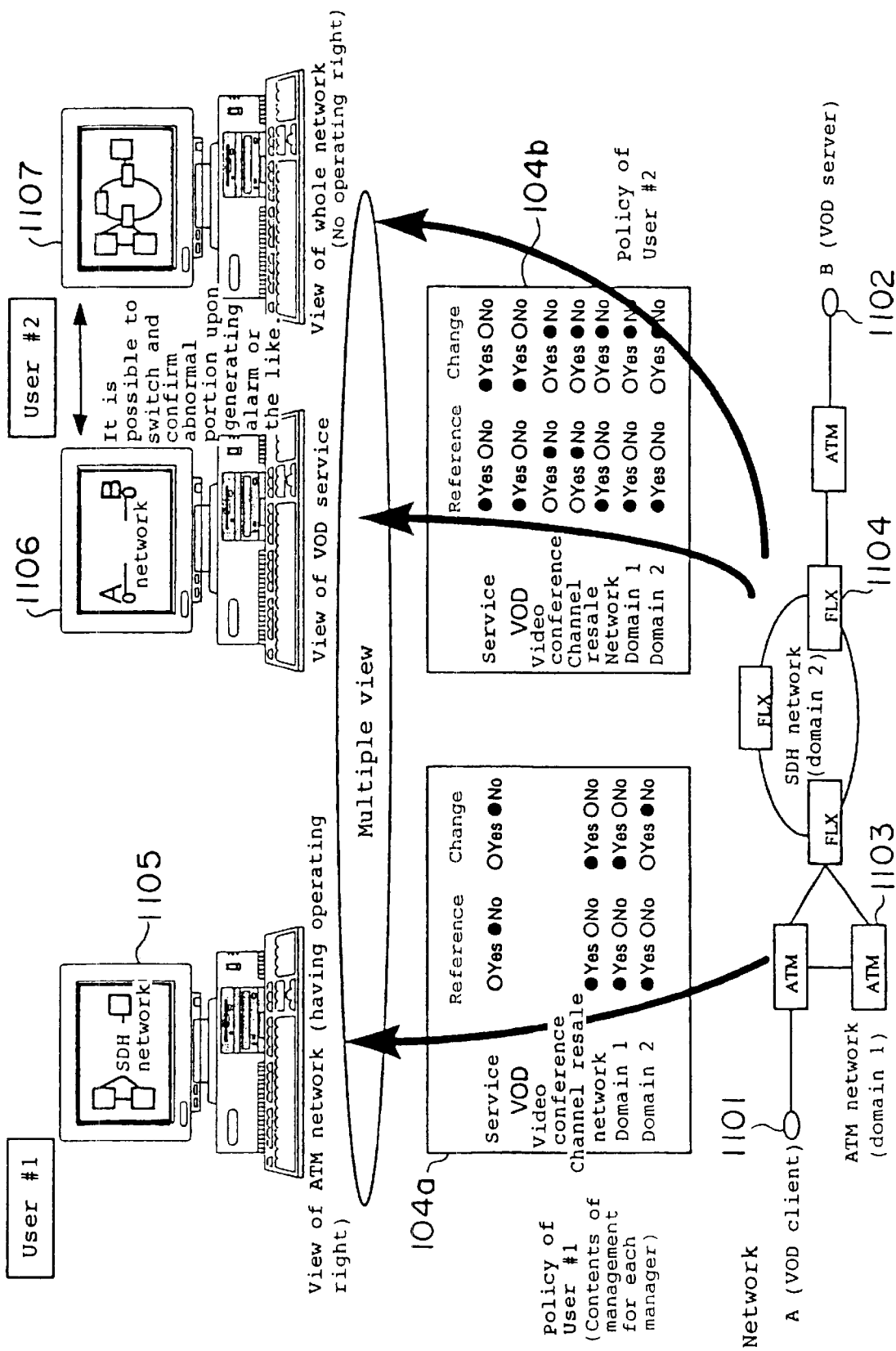
FIG. 13 is a diagram showing an interface of a policy enforcer according to the embodiment of the present invention.

FIG. 13 indicates a method of providing a different view every user on the basis of the policy management information 104 and the case where a VOD service is provided by the network. Namely, the case shows that a program is provided by a VOD server B (1102) via an SDH network in which a VOD client A (1101) comprises the ATM switch (ATM) and the transmission element (FLX).

In FIG. 13, the manager (user #1) of the ATM domain 1103 in the ATM network can receive an offer of a view shown by reference numeral 1105. The manager of an SDH domain 1104 in the SDH network can receive an offer of a view shown by reference numeral 1106 or 1107 in FIG. 13. Such a setting can be performed by changing a setting of the policy management information 104 through an interface like 104a or 104b.

[First Embodiment]

The embodiment in which the service management system as mentioned above is provided for an in-company intranet will be described.

Figure 14:
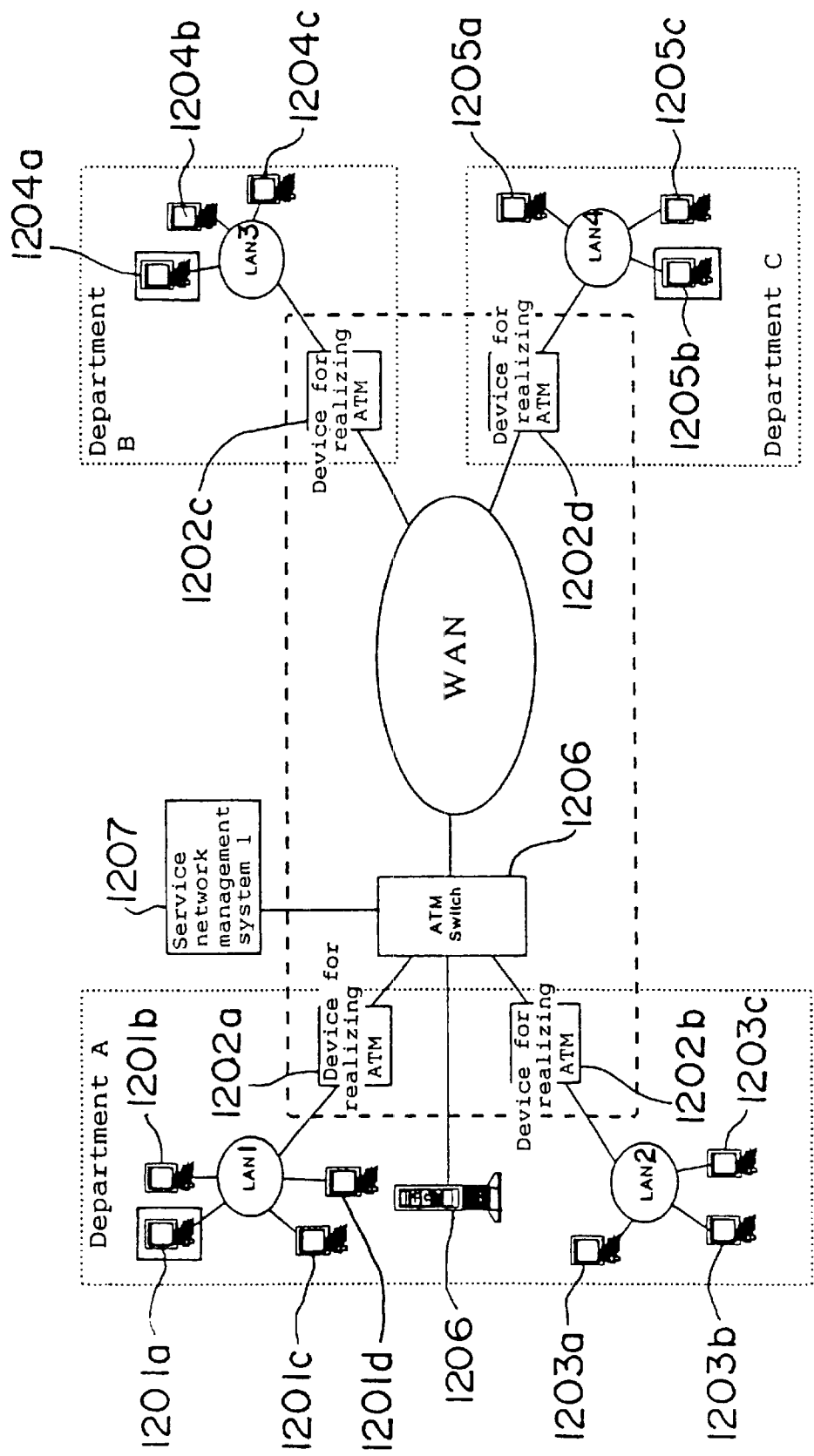
FIG. 14 is an explanatory diagram showing a network structure in the first embodiment.

FIG. 14 shows a network structure according to the embodiment.

In this embodiment, LANs (LANs 1 to 4) comprising three sections A to C are connected via elements 1202 a to 1202d for realizing ATM, an ATM switch 1206, and a WAN. A service providing terminal 1206 and a network managing terminal 1207 are connected to the ATM switch 1206. The service management system shown in FIG. 1 is set to the network managing terminal 1207.

Reference numerals 1201a to 1201d, 1203a to 1203c, 1204a to 1204c, and 1205a to 1205c denote user terminals which are connected to each LAN. In the user terminals, 1201a, 1204a, and 1205b function as subnetwork managing terminal of the section unit.

Figure 15:
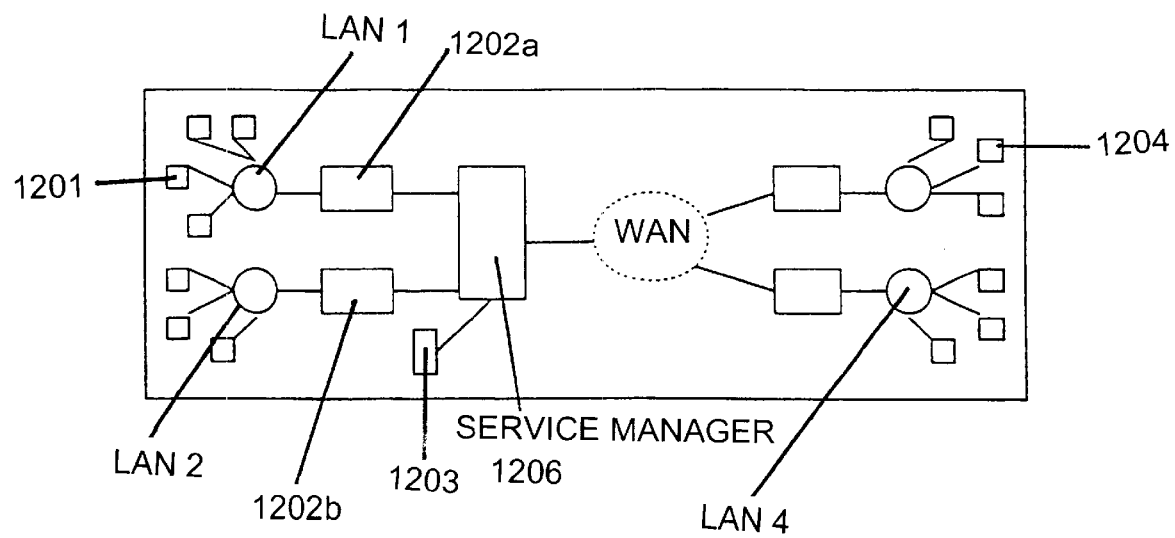
FIG. 15 is a diagram showing a work view of a network manager in a first embodiment of the present invention.

In FIG. 14, a company network manager monitors faults of the whole company network via the network managing terminal 1207. The picture plane of a view which is provided herein is shown in FIG. 15. In FIG. 15, a portion shown by a dotted line indicates a domain out of control.

In the case where a fault occurs in the network, the network manager notifies the subnetwork manager to which equipment in which the fault occurs or the link belongs and requests for maintenance.

In the case where a notification of a fault in another section is received by the network manager, the subnetwork having the fault is searched and a notification to a relevant subnetwork manager is performed. In the case of the service fault, the service manager (service providing terminal 1206) is also inquired.

Figure 16:
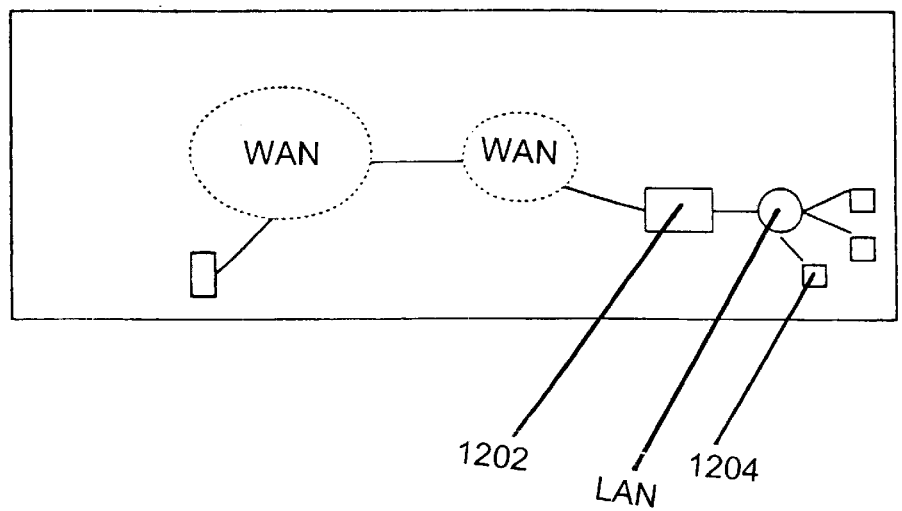
FIG. 16 is a diagram showing a work view of a subnetwork manager in the first embodiment of the invention.

For the subnetwork (here, in section C) manager, a view shown in FIG. 16 can be displayed on the his/her own subnetwork managing terminal 1205b, and the subnetwork controlled by himself can be monitored.

Figure 17:
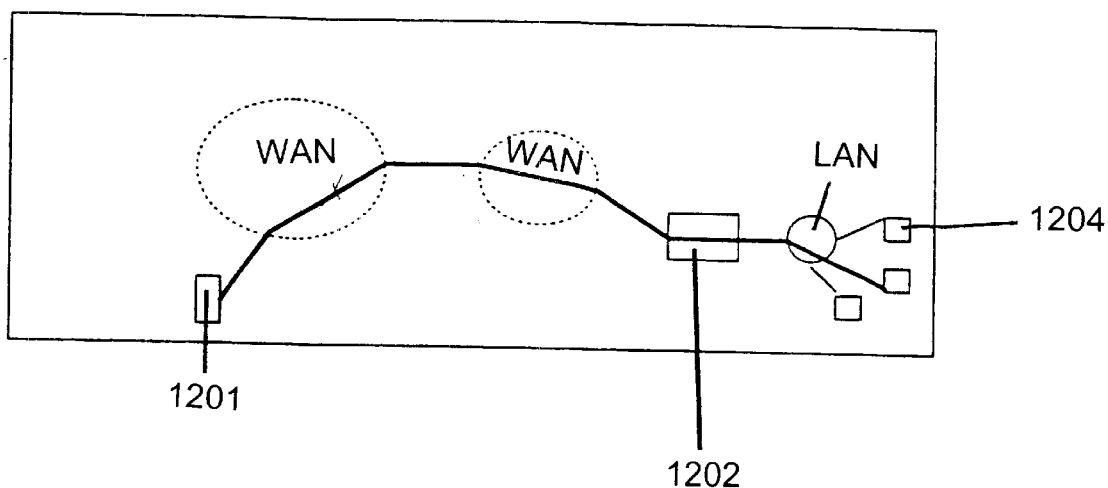
FIG. 17 is diagram showing a work view of a service user in the first embodiment of the invention.

A view of the services which are provided for the user out of section in his/her own using section by him can also be monitored (refer to FIG. 17).

If a fault occurs in the services, the subnetwork manager receives the notification from the user and searches a fault of relating equipment. When a fault portion exists in his/her own subnetwork, a relevant element is maintained. In the case where the fault portion exists in another subnetwork, a search for the fault subnetwork is requested for the network manager.

Figure 18:
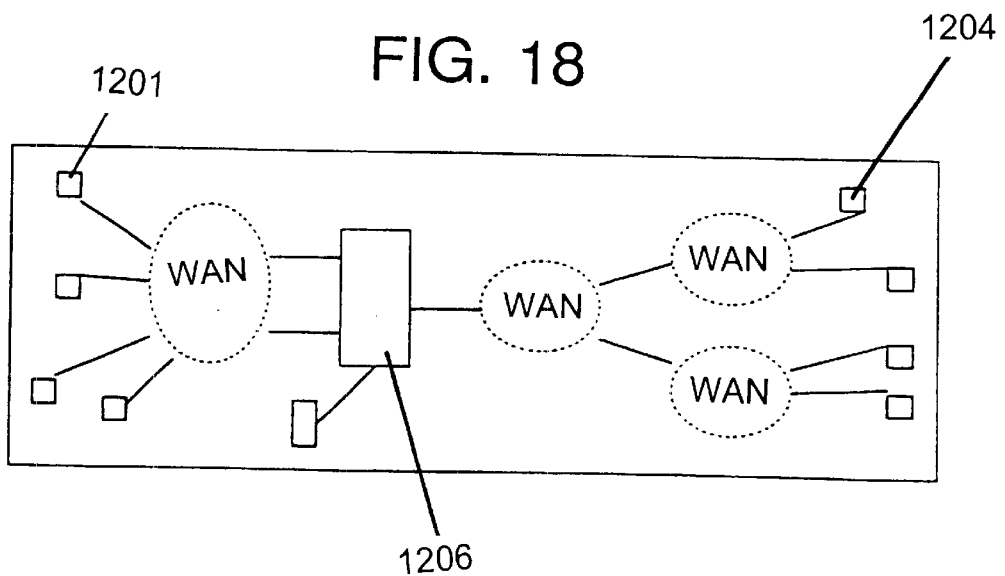
FIG. 18 is a diagram showing a work view of a service manager in the first embodiment of the invention.

FIG. 18 shows a structure of the view picture plane provided for a manager (hereinafter, referred to as a service manager) of the services which are provided by the service providing server 1206.

The service manager, as shown in FIG. 18, monitors the view of the services which are provided by the service providing terminal 1206.

When the user of the services starts to provide services such as in-company VOD or the like from the user terminal 1201 or the like, an (end-to-end) communication path between terminals is set. The path is released at the end of the services. The service providing terminal 1206 also executes a schedule management of the services and the like for security of band. If provided services are influenced by a fault of the network equipment, the service manager detects it and notifies the influenced service user.

By dividing the services and the management range of the network, loads on the central manager can be dispersed.

[Second Embodiment]

Figure 19:
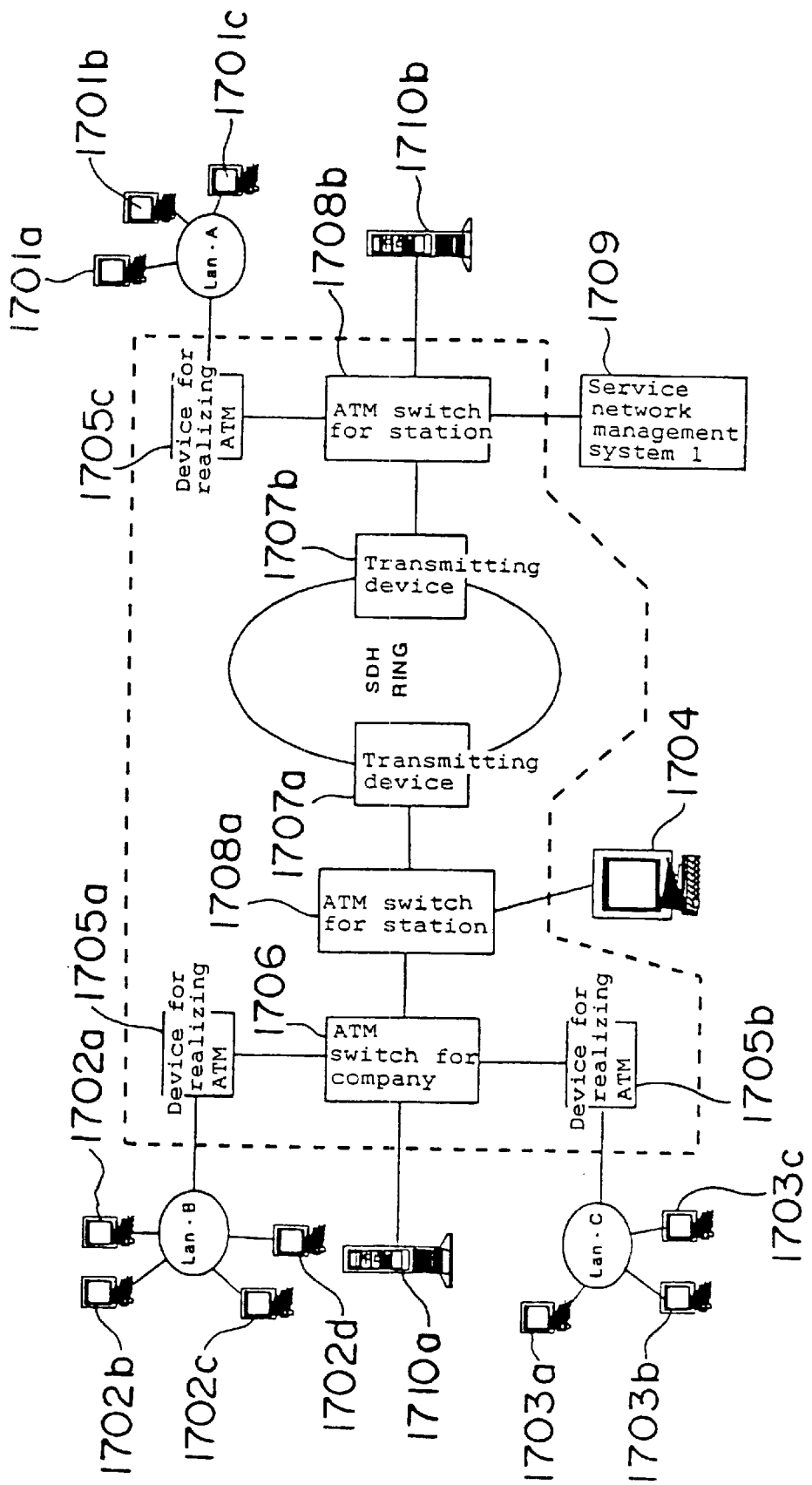
FIG. 19 is an explanatory diagram showing a network structure in a second embodiment of the invention.

FIG. 19 shows a network structure in which the service management system of the invention is provided for a carrier/a service provider.

LANs A to C are connected to an ATM network (a portion surrounded by dotted line in FIG. 19) comprising elements 1705a to 1705c for realizing ATM, an ATM switch 1706 for company, and ATM switches 1708a and 1708b for station and, further, each of the ATM switches 1708a and 1708b for station is connected to an SDH ring network comprising transmitting elements 1707a to 1707b. In FIG. 19, reference numeral 1709 denotes the network management terminal; 1710a to 1710b service providing terminals; and 1701a to 1701c, 1702a to 1702c, and 1703a to 1703c the user terminals.

Figure 20:
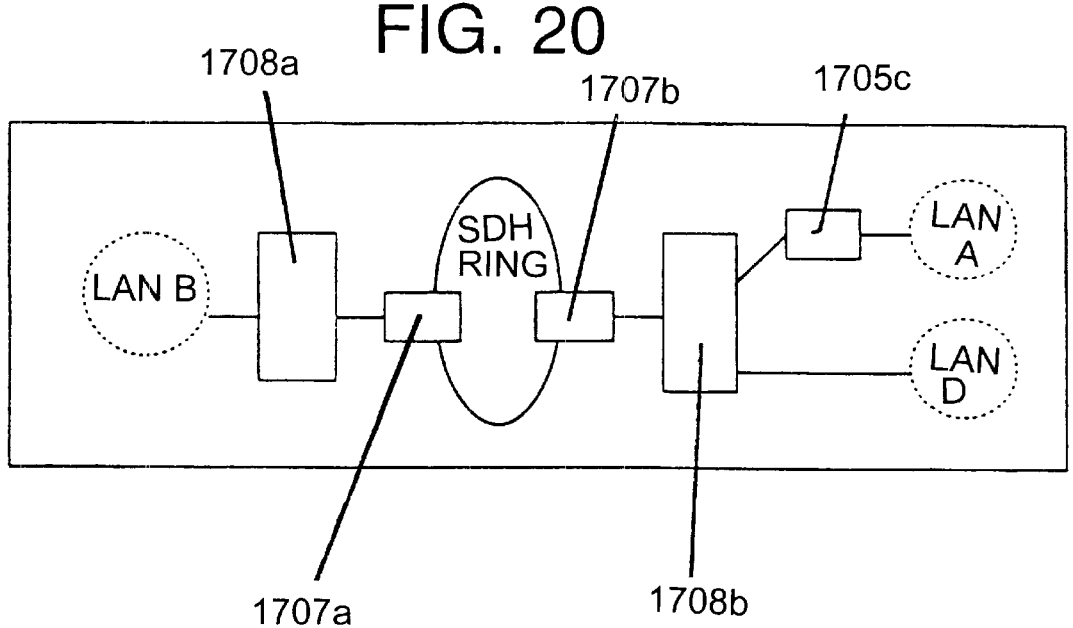
FIG. 20 is a diagram showing a work view of a network manager in the second embodiment of the invention.

A network manager (carrier provider) who manages the network management terminal 1709 monitors a fault of the whole network while monitoring a view shown in FIG. 20. If the network fault occurs, he maintains the fault portion for himself (only the carrier network).

When the network fault occurs, an influenced service is detected and the situation is grasped before receiving a petition by the service manager.

Further, in the case where a research is requested by the service manager due to the service fault or the like, the research is made.

Figure 21:
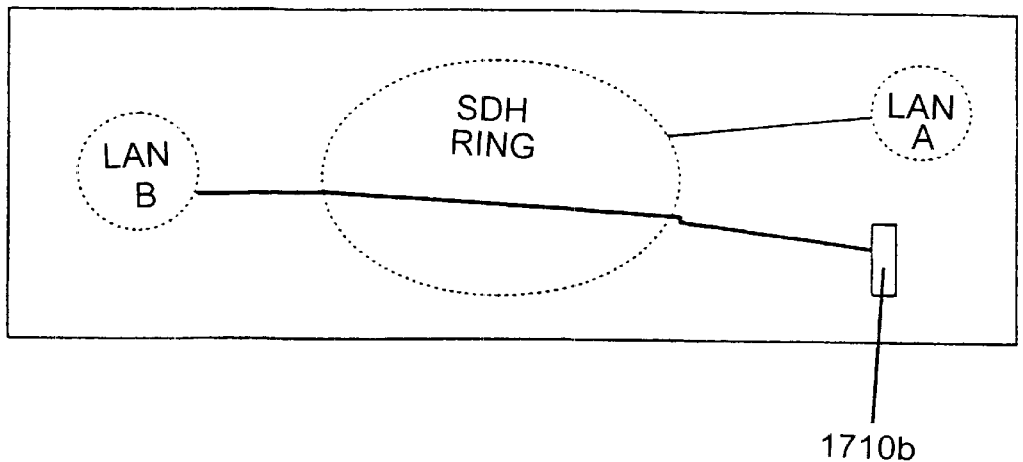
FIG. 21 is a diagram showing a work view of a service manager in the second embodiment of the invention.

The service manager (service provider) who provides the services by the service providing terminal 1710a monitors the services that he provides for himself while referring a view shown in FIG. 21.

When a fault occurs in the services (the petition is received by a service subscriber), a portion in which the fault occurs is specified. In the case where there is the relevant portion in his/her own network or equipment (a video server or the like) he provides for himself, the relevant portion is maintained. In other cases, a research is requested to the foregoing network manager.

If a fault occurs in the equipment on the network, the influence on the services is automatically notified and the situation is grasped before receiving the petition by the service subscriber.

The end-to-end communication path is set at the time of starting the services by the service user. The path is released at the end of the services.

The service providing terminal 1701 monitors service schedule management for the band guarantee and a using situation (account information) of the all subscribers.

Figure 22:
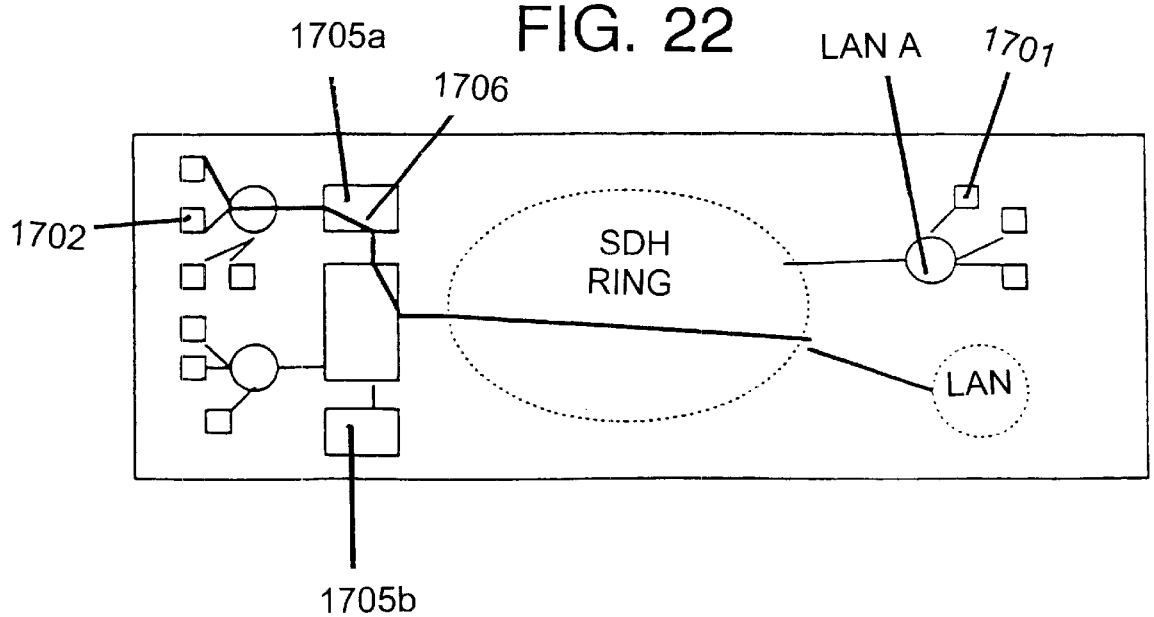
FIG. 22 is a diagram showing a work view of a service user in the second embodiment of the invention.

The user (a subscriber: a company or a private person) can grasp the using situation of the services that he is provided in the user terminal 1702 by referring to a view shown in FIG. 22. A using situation (account information) of the network can be seen. Further, the path setting/releasing is requested to the service manager at the start/end of using the services. The operating right of the services is supplied and he can also set/release the path for himself.

By dispersing the authorities of the network management and the service management, a load of each manager can be reduced. The service provider and the service manager do not always need to coincide and an outsourcing of the service management can also be executed.

In the service management system 100 shown in FIG. 1, a module for accounting which cooperates with each of modules (EAM, LDM, and MDM) and accounts and manages a network toll (or information based on it) by network using time and use construction can also be provided.

It is also possible that a schedule management module is added and the service user previously can register time when he wants to offer the services. Thus, the path can automatically be set/released at the corresponding time by periodically monitoring. The path setting and releasing can be realized by cooperation with each of modules (EAM, LDM, and MDM). It is allowable that the path is set/released by depending on time and the path of the reserved band is set in only reserved time by the user.

According to the invention, concentration of the management operation to the central manager can be avoided and the management every section which occupies the service utilization and every authority or work can be performed.

In a number of vendors and technology networks, the end to end path setting which is needed for providing the services by a simply operation can be provided in the range of the authority to the user.

What is claimed is:

1. A network service management apparatus used in communication services which are provided on one or a plurality of networks, comprising:

a network managing part managing network elements, a physical link, or a path, which constructs said network;

a service managing part managing the services which are provided on said network;

a policy management information part managing a work definition of a user which is connected to said network; and a service management information generating part generating information which is provided to the user by relating information from said network managing part with information from said service managing part and, further referring to said policy management information part in response to a request from the user to generate information to be provided to the user, only information needed by said user individually being generated and provided, wherein said service management information generating part comprises:

an element accessing part collecting information from network elements;

a domain managing part which serves as an upper module of said element accessing part and divides said network into domains and manages the domains, each of which is managed by each subnetwork manager; and a multi-domain managing part, provided in every said network, and setting and releasing an end-to-end communication path on said network as an upper module of said domain managing part.

2. A network service management apparatus according to claim 1, further comprising a work view generating part generating an individual work view for the user with reference to work management information.

3. A network service management apparatus according to claim 1, further comprising a discriminating part evaluating validity of said work definition when a petition of the work definition from the petitioned user is made.

4. A network service management apparatus according to claim 1, further comprising:

a fault detecting part, on the network; and a fault information converting part converting fault detection information into information within an influence range.

5. A network service management apparatus according to claim 4, wherein said fault information converting part is provided in said element accessing part.

* * * * *